United States Patent
Lennartz et al.

(10) Patent No.: US 7,351,808 B2
(45) Date of Patent: Apr. 1, 2008

(54) ANIONIC MONOAZO DYES

(75) Inventors: Michael Lennartz, Lörrach (DE); Sandra Weiss, Lörrach-Brombach (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 405 days.

(21) Appl. No.: 10/520,964

(22) PCT Filed: Jul. 17, 2003

(86) PCT No.: PCT/EP03/07770

§ 371 (c)(1),
(2), (4) Date: Jan. 11, 2005

(87) PCT Pub. No.: WO2004/013233

PCT Pub. Date: Feb. 12, 2004

(65) Prior Publication Data

US 2005/0256305 A1    Nov. 17, 2005

(30) Foreign Application Priority Data

Jul. 26, 2002    (EP) ................... 02405652

(51) Int. Cl.
*C09B 29/01* (2006.01)
*C09B 29/30* (2006.01)
*C09B 43/16* (2006.01)
*D21H 21/28* (2006.01)

(52) U.S. Cl. ............... 534/798; 534/803; 8/518; 8/527; 8/673; 8/682; 8/919

(58) Field of Classification Search ............ 534/798, 534/803; 8/518, 527, 673, 682, 919
See application file for complete search history.

(56) References Cited

U.S. PATENT DOCUMENTS 2,929,809 A * 3/1960 Menzi .................. 534/701
5,929,215 A * 7/1999 Pedrazzi ............... 534/604
7,066,969 B2 * 6/2006 Lennartz et al. .......... 8/673

FOREIGN PATENT DOCUMENTS

JP    2005042028    *    2/2005

OTHER PUBLICATIONS

Fogg et al., Analytica Chimica Acta, 362(2-3), 235-240, 1998.*

* cited by examiner

*Primary Examiner*—Fiona T Powers
(74) *Attorney, Agent, or Firm*—Shiela A. Loggins

(57) ABSTRACT

Anionic monoazo dyes of the formula (1) in which A represents 1- or 2-naphthyl residue, which is substituted by a total of one or two sulphonic and/or carboxylic acid groups. $R_1$ represents hydrogen or $C_1$-$C_4$alkyl, each $D_1$ and $D_2$, independently of the other, represent either an amino acid residue resulting from removal of a hydrogen atom from the amino group of the amino acid or the residue —$NR_2R_3$, in which each $R_2$ and $R_3$, independently of the other, represent hydrogen, $C_1$-$C_4$alkyl, $C_2$-$C_6$alkyl which is substituted by hydroxy, halogen or cyano, phenyl which is unsubstituted or monosubstituted by hydroxy, halogen, $SO_3H$, $C_1$-$C_4$alkyl or $C_1$-$C_4$alkoxy or alternatively, $R_2$ and $R_3$, together with the nitrogen atom to which they are connected, complete a saturated 5- or 6-membered ring which may contain, in addition to the nitrogen atom, one nitrogen or oxygen atom and which may be further substituted and n is 0 or 1, a process for their preparation and the use of these dyes for dyeing natural or synthetic materials, in particular, paper (1)

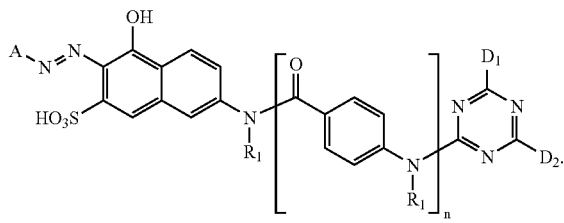

12 Claims, No Drawings

ANIONIC MONOAZO DYES

The present invention relates to novel anionic monoazo dyes, a process for their preparation and the use of these dyes for dyeing natural or synthetic materials, in particular, paper.

Monoazo dyes based on coupling reactions of diazotised aromatic amines with 1,3,5-triazinyl-l-acid derivatives have previously been described, for example, in EP 548,795, solely in the form of reactive dyes for cotton.

Furthermore, in recent years, the use of concentrated aqueous solutions of dyes has gained importance because of the advantages possessed by such solutions when compared with dyes in powder form. The use of solutions avoids the difficulties associated with dust formation and releases the user from the time-consuming and frequently difficult dissolving of the dye powder in water. The use of concentrated solutions was also prompted by the development of continuous dyeing processes for paper, since it is convenient In these processes to meter the solution directly into the pulp stream or to add it at some other suitable point of the papermaking process.

Surprisingly, it has now been found that anionic dyes based on this chromophoric system are especially valuable for use in dyeing paper, since they possess highly desirable yellowish-red shades. Such shades of dyeings have, hitherto, only been attainable with difficulty, since no single dyestuff has been available and it has been necessary to incorporate mixtures of yellow and red dyes to obtain such shades. Furthermore, the dyes of the present invention exhibit high degrees of exhaustion under particular dyeing conditions, resulting in dyeings of exceptional brilliance not obtainable by the use of mixtures. In addition the dyes of the invention exhibit excellent water-solubility, thus enabling the ready preparation of concentrated liquid selling grades.

Accordingly, the invention relates to compounds of the formula

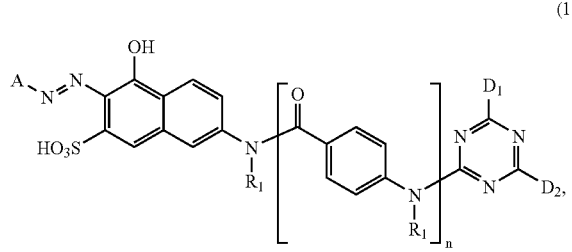

in which

A represents a 1- or 2-naphthyl residue, which is substituted by a total of one or two sulphonic
  and/or carboxylic acid groups, preferably a 1- or 2-naphthyl mono- or disulphonic acid or a 1- or 2-naphthyl monocarboxylic acid residue, $R_1$ represents hydrogen or $C_1$-$C_4$alkyl, each $D_1$ and $D_2$, independently of the other, represent either an amino acid residue resulting from removal of a hydrogen atom from the amino group of the amino acid or the residue —$NR_2R_3$, in which each $R_2$ and $R_3$, independently of the other, represent hydrogen, $C_1$-$C_4$alkyl, $C_2$-$C_6$alkyl which is substituted by hydroxy, halogen or cyano, phenyl which is unsubstituted or monosubstituted by hydroxy, halogen, $SO_3H$, $C_1$-$C_4$alkyl or $C_1$-$C_4$alkoxy or, alternatively, $R_2$ and $R_3$, together with the nitrogen atom to which they are connected, complete a saturated, 5- or 6-membered ring which may contain, in addition to the nitrogen atom, one nitrogen or oxygen atom and which may be further substituted and n is 0 or 1.

More preferred compounds of formula (1) are those in which $R_1$ represents hydrogen $D_1$ and $D_2$, independently of the other, is an amino acid residue resulting from removal of a hydrogen atom from the amino group of the amino acid and which is derived from glycine, alanine, serine, cysteine, phenylalanine, tyrosine (4-hydroxyphenylalanine), diiodotyrosine, tryptophan (β-indolylalanine), histidine ((β-imidazolylalanine), α-aminobutyric acid, methionine, valine (α-aminoisovaleric acid), norvaline, leucine (α-aminosocaproic acid), isoleucine (α-amino-β-methylvaleric acid), norleucine (α-amino-n-caproic acid), arginine, ornithine (α,δ-diaminovaleric acid), lysine (α,ε-diaminocaproic acid), aspartic acid (aminosuccinic acid), glutamic acid (α-aminoglutaric acid), threonine and hydroxyglutamic acid as well as mixtures and optical isomers thereof or from iminodiacetic acid, a residue —$NR_2R_3$, in which each $R_2$ and $R_3$, independently of the other, represent hydrogen, $C_2$-$C_4$hydroxyalkyl, phenyl, which is unsubstituted or monosubstituted by $SO_3H$ or, alternatively, a morpholino, piperidino or pyrrolidino residue.

Especially preferred compounds of formula (1) are those in which

A represents a 1-naphthyl-2-, 3-, 4-, 5-, 6-, 7- or 8-sulphonic acid, a 2-naphthyl-1-, 5-, 6- or 7-sulphonic acid, a 2-naphthyl-1-, 3- or 6-carboxylic acid, a 1-naphthyl-3,8- or 4,8-disulphonic acid or a 2-naphthyl-1,5-, 3,6-, 4,8- or 6,8-disulphonic acid residue and each $D_1$ and $D_2$, independently of the other, is an amino acid residue from which a hydrogen atom on the amino group has been removed and which is derived from glycine, alanine, serine, phenylalanine, aspartic acid (aminosuccinic acid) or glutamic acid (α-aminoglutaric acid), a residue —$NR_2R_3$, in which each $R_2$ and $R_3$, independently of the other, represent hydrogen, $C_2$-$C_3$hydroxyalkyl, phenyl, which is unsubstituted or monosubstituted by $SO_3H$ or, alternatively, a morpholino residue.

Most especially preferred compounds of formula (1) are those in which

A represents a 1-naphthyl-2-, 3-, 4-, 5-, 6-, 7- or 8-sulphonic acid, a 2-naphthyl-1-, 5-, 6- or 7-sulphonic acid, a 2-naphthyl-1-, 3- or 6-carboxylic acid, a 1-naphthyl-3,8- or 4,8-disulphonic acid or a 2-naphthyl-1,5-, 3,6-, 4,8- or 6,8-disulphonic acid residue, most especially, when n is 0, a 2-naphthyl-6- or 7-sulphonic acid residue and, when n is 1, a 1-naphthyl-4-sulphonic acid, 2-naphthyl-6-sulphonic acid or a 2-naphthyl-1,5-disulphonic acid residue, $R_1$ represents hydrogen and both $D_1$ and $D_2$ represent the group —$NHCH_2CH_2OH$.

The sulphonic and/or carboxylic acid groups present in compounds of formula (1) may be present either in the form of the free acid or in the salt form, $SO_3M$ and/or $CO_2M$. M is preferably one equivalent of a colourless cation, typically lithium, sodium, potassium, ammonium or the protonated form of a $C_4$-$C_{12}$trialkylamine, $C_4$-$C_{12}$diamine, $C_2$-$C_{12}$- alkanolamine or of a polyglycol amine, conveniently, triethanolamine trisglycol ether, or mixtures of such cationic species.

M as a protonated $C_4$-$C_{12}$trialkylamine may, for example, be a protonated N-ethyl-dimethylamine, N,N-diethylmethylamine, tri-n-propylamine, tri-n-butylamine, tri-isobutylamine, and, preferably, triethylamine or triisopropylamine.

M as a protonated $C_4$-$C_{12}$diamine may, for example, be ethylenediamine, or 1,3-diaminopropane, in which one or both nitrogen atoms are additionally substituted by one or two $C_1$-$C_4$alkyl radicals, preferably methyl or ethyl radicals. M is preferably an N,N-dialkylethylenediamine or N,N-dialkyl-1,3-diaminopropane. Illustrative examples are: N-ethylethylenediamine, N,N-dimethylethylenediamine, N,N'-dimethylethylenediamine, N,N-diethylethylenediamine, 3-dimethylamino-1-propylamine or 3-diethylamino-1-propylamine. M as a protonated $C_2$-$C_{12}$alkanolamine may be the protonated form of a monoalkanolamine, dialkanolamine, monoalkanolmonoalkylamine, monoalkanoldialkylamine, dialkanolalkylamine or trialkanolamine or a mixture of different protonated alkanolamines. Illustrative examples are: protonated 2-aminoethanol, bis(2-hydroxyethyl)amine, N-(2-hydroxyethyl)dimethylamine, N-(2-hydroxyethyl)diethylamine, N,N-bis(2-hydroxyethyl)ethylamine or tris(2-hydroxyethyl)-amine.

Within the scope of the definitions of $R_1$ as $C_1$-$C_4$alkyl and $R_2$ and/or $R_3$ as $C_1$-$C_4$alkyl and/or $C_2$-$C_6$alkyl which is substituted by hydroxy, halogen or cyano, these alkyl radicals may be branched or unbranched, for example, methyl, ethyl, n-propyl, isopropyl, n-butyl, sec-butyl, isobutyl, t-butyl, 2-ethylbutyl, n-pentyl, isopentyl, 1-methylpentyl, 1,3-dimethylbutyl or n-hexyl.

Similarly, $C_1$-$C_4$alkoxy may be, for example, methoxy, ethoxy, n-propoxy, isopropoxy, n-butoxy, sec-butoxy, isobutoxy or t-butoxy.

Halogen in the above formulae and radicals is iodine, bromine, fluorine or, especially, chlorine.

The dyes of formula (1) of the invention may be prepared by known methods, for example by reacting the diazonium salt of an amine of the formula $$A\text{-}NH_2 \qquad (2)$$

with either 2-amino- or 2-$C_1$-$C_4$alkylamino-5-hydroxynaphthalene-7-sulphonic acid (where n=0) or with 2-(4amino- or 4-$C_1$-$C_4$alkylaminobenzoyl)amino- or $C_1$-$C_4$alkylamino-5-hydroxynaphthalene-7-sulphonic acid (where n=1), reaction with cyanuric chloride and subsequent sequential reaction of the dichloro intermediate with amines $D_1H$ and $D_2H$ or, alternatively, reacting 2-amino- or 2-$C_1$-$C_4$ alkylamino-5-hydroxynaphthalene-7-sulphonic acid (where n=0) or 2-(4-amino- or 4-$C_1$-$C_4$alkylaminobenzoyl)amino- or $C_1$-$C_4$alkylamino-5-hydroxynaphalene-7-sulphonic acid (where n=1) with cyanuric chloride, followed by sequential reaction of the dichloro intermediate with amines $D_1H$ and $D_2H$ and, finally, reaction with the diazonium salt of the amine of formula (2), whereby A, $D_1$, $D_2$ and n are as previously defined, the latter procedure being preferred.

The dyes of the invention may be used to dye natural or synthetic materials, for example, cellulosic materials, carbonamide group containing materials such as polyamides, leather or glass fibres, but are particularly useful for dyeing paper. They are preferably used as a solid or liquid commercial form.

The pulverulent or granular form of the dye can be used particularly in batchwise pulp dyeing where the dye mixture, customarily in the form of a stock solution, is added in the pulper, in the beater or in the mixing chest. Preference is here given to using dye preparations which as well as the dye, may further include extenders, for example urea as solubilizer, dextrin, Glauber salt, sodium chloride and also dispersants, dustproofing agents and sequestrants, such as tetrasodium phosphate.

The present invention accordingly further provides solid dye preparations for dyeing paper comprising a compound of the formula (1) and, optionally, further auxiliaries.

The present invention further provides aqueous solutions, preferably concentrated solutions, for dyeing paper, comprising a compound of the formula (1), preferably in a concentration of from 5 to 30% by weight. Due to their excellent solubility in water, the dyes of formula (1) are particularly suitable for the preparation of such solutions.

The concentrated solutions preferably contain a low level of inorganic salts, which may be achieved, if necessary, by known methods, for example reverse osmosis.

The solutions may include further auxiliaries, for example solubilizers such as ε-caprolactam or urea, organic solvents, for example glycols, polyethylene glycols, dimethyl sulphoxide, N-methylpyrrolidone, acetamide, alkanolamines or polyglycolamines, which is a still further aspect of the invention.

In addition, the aqueous dye solutions of the present invention may be applied to paper by use of the so-called spraying technique.

The novel dyes of the invention dye paper in predominantly reddish shades with excellent degrees of exhaustion with high colour strength, whilst being sufficiently water-soluble to provide stable aqueous formulations without the need for large quantities of solubilizers. Furthermore, dyeings obtained exhibit high degrees of bleed- and light-fastness and are readily bleachable.

Furthermore, as a result of their high colour strength and water solubility, the novel dyes of the invention are suitable for use in the ink-jet printing method.

Consequently, one further aspect of the invention is paper, which is dyed with a compound of the formula (1), either in the form of a solid dye preparation, or an aqueous solution, as described above, as well as the use of the compounds of formula (1), according to the invention, for dyeing paper.

The following examples serve to illustrate the invention without intending to be restrictive in nature. Parts and percentages are by weight unless otherwise stated.

EXAMPLES (A) Synthesis of Intermediate Triazinylamino-l-acid Derivatives

Example 1

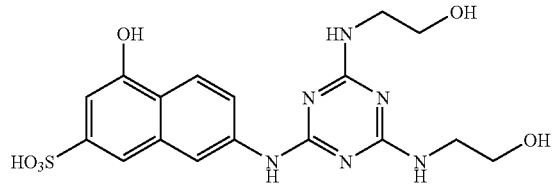

(100a)

36.9 g of cyanuric chloride are dissolved in 185 ml of acetone and added to 200 g of ice water at 0° C. At an initial temperature of 0-50° C. and, subsequently, at 20° C., 28.7 g of ethanolamine are added drop wise with stirring, the pH being maintained at 5.5-6.5. After 2.5 hours, the temperature is increased to 40-50° C. and the pH maintained at 6.5-7.0 by addition of a total of 164 ml of 2N aqueous sodium hydroxide solution. After a further 2 hours the consumption of sodium hydroxide ceases, the reaction mixture is stirred for a further 30 minutes, cooled to room temperature and the white suspension filtered. There are obtained 46.7 g of the disubstituted intermediate which are suspended in 300 g of water and treated with 47.9 g of l-acid (7-amino-4-hydroxy naphthalene-2-sulphonic acid). The resulting beige suspension is heated to 85° C. and the pH maintained at 3.0 by addition of a total of 94 ml of 2N aqueous sodium hydroxide solution. After stirring for 3 hours reaction is complete, the pH is adjusted to 5.5 by addition of a further 8 ml of 2N aqueous sodium hydroxide solution, the suspension cooled to room temperature and the precipitated solids filtered. There are obtained 77 g of the compound of formula (100a).

Example 2

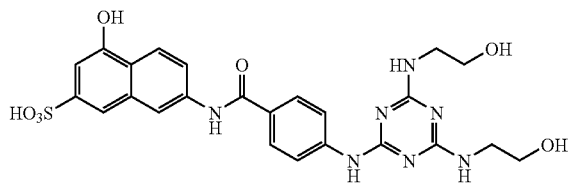

(100b)

36.9 g of cyanuric chloride are dissolved in 185 ml of acetone and added to 200 g of ice water at 0° C. At an initial temperature of 0-5° C. and, subsequently, at 20° C., 28.7 g of ethanolamine are added drop wise with stirring, the pH being maintained at 5.5-6.5. After 2.5 hours, the temperature is increased to 40-50° C. and the pH maintained at 6.5-7.0 by addition of a total of 164 ml of 2N aqueous sodium hydroxide solution. After a further 2 hours the consumption of sodium hydroxide ceases, the reaction mixture is stirred for a further 30 minutes, cooled to room temperature and the white suspension filtered. There are obtained 46.7 g of the disubstituted intermediate which are suspended in 300 g of water and treated with 71.7 g of p-aminobenzoyl-l-acid (7-(4-benzoylamino)-4-hydroxy naphthalene-2-sulphonic acid). The resulting beige suspension is heated to 100° C. and the pH maintained at 3.0 by addition of a total of 86 ml of 2N aqueous sodium hydroxide solution. After stirring for 6 hours reaction is complete, the pH is adjusted to 5.7 by addition of a further 16 ml of 2N aqueous sodium hydroxide solution, the suspension cooled to room temperature and the precipitated solids filtered. After purification by washing with dilute hydrochloric acid, there are obtained 80 g of the compound of formula (100b).

Examples 3-150

By proceeding in an analogous manner to that described in Examples 1 or 2, respectively, but replacing the ethanolamine by amines $D_1H$ and/or $D_2H$, the following compounds of formula

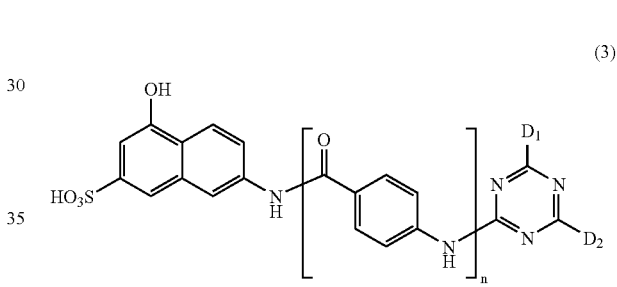

(3)

are obtained, as summarized in Table 1 below.

TABLE 1

| Example Nr. | Compound Nr. | $D_1$ | $D_2$ | n |
|---|---|---|---|---|
| 3 | (101a) | —NHCH$_2$CH$_2$OH | —N(CH$_2$CH$_2$OH)$_2$ | 0 |
| 4 | (101b) | —NHCH$_2$CH$_2$OH | —N(CH$_2$CH$_2$OH)$_2$ | 1 |
| 5 | (102a) | —NHCH$_2$CH$_2$OH | —NHCH$_2$CH(CH)$_3$OH | 0 |
| 6 | (102b) | —NHCH$_2$CH$_2$OH | —NHCH$_2$CH(CH)$_3$OH | 1 |
| 7 | (103a) | —NHCH$_2$CH$_2$OH | —N(morpholino) | 0 |
| 8 | (103b) | —NHCH$_2$CH$_2$OH | —N(morpholino) | 1 |
| 9 | (104a) | —NHCH$_2$CH$_2$OH | —NH-phenyl | 0 |
| 10 | (104b) | —NHCH$_2$CH$_2$OH | —NH-phenyl | 1 |

TABLE 1-continued

| Example Nr. | Compound Nr. | D$_1$ | D$_2$ | n |
|---|---|---|---|---|
| 11 | (105a) | —NHCH$_2$CH$_2$OH | 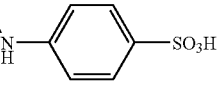 4-aminobenzenesulfonic acid linkage | 0 |
| 12 | (105b) | —NHCH$_2$CH$_2$OH | 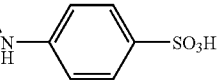 4-aminobenzenesulfonic acid linkage | 1 |
| 13 | (106a) | —NHCH$_2$CH$_2$OH | 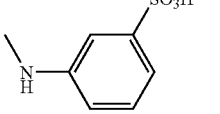 3-aminobenzenesulfonic acid linkage | 0 |
| 14 | (106b) | —NHCH$_2$CH$_2$OH | 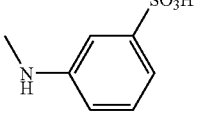 3-aminobenzenesulfonic acid linkage | 1 |
| 15 | (107a) | —N(CH$_2$CH$_2$OH)$_2$ | —N(CH$_2$CH$_2$OH)$_2$ | 0 |
| 16 | (107b) | —N(CH$_2$CH$_2$OH)$_2$ | —N(CH$_2$CH$_2$OH)$_2$ | 1 |
| 17 | (108a) | —N(CH$_2$CH$_2$OH)$_2$ | —NHCH$_2$CH(CH$_3$)OH | 0 |
| 18 | (108b) | —N(CH$_2$CH$_2$OH)$_2$ | —NHCH$_2$CH(CH$_3$)OH | 1 |
| 19 | (109a) | —N(CH$_2$CH$_2$OH)$_2$ | 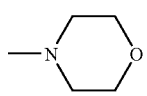 morpholino | 0 |
| 20 | (109b) | —N(CH$_2$CH$_2$OH)$_2$ | 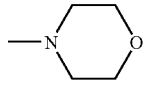 morpholino | 1 |
| 21 | (110a) | —N(CH$_2$CH$_2$OH)$_2$ | 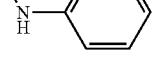 anilino | 0 |
| 22 | (110b) | —N(CH$_2$CH$_2$OH)$_2$ | 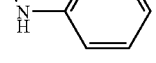 anilino | 1 |
| 23 | (111a) | —N(CH$_2$CH$_2$OH)$_2$ | 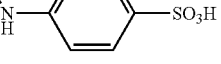 4-aminobenzenesulfonic acid linkage | 0 |
| 24 | (111b) | —N(CH$_2$CH$_2$OH)$_2$ | 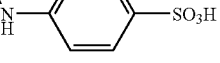 4-aminobenzenesulfonic acid linkage | 1 |
| 25 | (112a) | —N(CH$_2$CH$_2$OH)$_2$ | 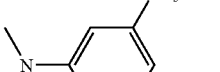 3-aminobenzenesulfonic acid linkage | 0 |
| 26 | (112b) | —N(CH$_2$CH$_2$OH)$_2$ |  3-aminobenzenesulfonic acid linkage | 1 |
| 27 | (113a) | —NHCH$_2$CH(CH$_3$)OH | —NHCH$_2$CH(CH$_3$)OH | 0 |

TABLE 1-continued

| Example Nr. | Compound Nr. | D₁ | D₂ | n |
|---|---|---|---|---|
| 28 | (113b) | —NHCH₂CH(CH)₃OH | —NHCH₂CH(CH)₃OH | 1 |
| 29 | (114a) | —NHCH₂CH(CH)₃OH | morpholino | 0 |
| 30 | (114b) | —NHCH₂CH(CH)₃OH | morpholino | 1 |
| 31 | (115a) | —NHCH₂CH(CH)₃OH | NH-phenyl | 0 |
| 32 | (115b) | —NHCH₂CH(CH)₃OH | NH-phenyl | 1 |
| 33 | (116a) | —NHCH₂CH(CH)₃OH | NH-C₆H₄-SO₃H (para) | 0 |
| 34 | (116b) | —NHCH₂CH(CH)₃OH | NH-C₆H₄-SO₃H (para) | 1 |
| 35 | (117a) | —NHCH₂CH(CH)₃OH | NH-C₆H₄-SO₃H (meta) | 0 |
| 36 | (117b) | —NHCH₂CH(CH)₃OH | NH-C₆H₄-SO₃H (meta) | 1 |
| 37 | (118a) | morpholino | morpholino | 0 |
| 38 | (118b) | morpholino | morpholino | 1 |
| 39 | (119a) | morpholino | NH-phenyl | 0 |
| 40 | (119b) | morpholino | NH-phenyl | 1 |
| 41 | (120a) | morpholino | NH-C₆H₄-SO₃H (para) | 0 |
| 42 | (120b) | morpholino | NH-C₆H₄-SO₃H (para) | 1 |

TABLE 1-continued

| Example Nr. | Compound Nr. | D₁ | D₂ | n |
|---|---|---|---|---|
| 43 | (121a) | 4-methylmorpholine | 3-(methylamino)benzenesulfonic acid | 0 |
| 44 | (121b) | 4-methylmorpholine | 3-(methylamino)benzenesulfonic acid | 1 |
| 45 | (122a) | N-methylaniline | 4-(methylamino)benzenesulfonic acid | 0 |
| 46 | (122b) | N-methylaniline | 4-(methylamino)benzenesulfonic acid | 1 |
| 47 | (123a) | N-methylaniline | 3-(methylamino)benzenesulfonic acid | 0 |
| 48 | (123b) | N-methylaniline | 3-(methylamino)benzenesulfonic acid | 1 |
| 49 | (124a) | 4-(methylamino)benzenesulfonic acid | 4-(methylamino)benzenesulfonic acid | 0 |
| 50 | (124b) | 4-(methylamino)benzenesulfonic acid | 4-(methylamino)benzenesulfonic acid | 1 |
| 51 | (125a) | 4-(methylamino)benzenesulfonic acid | 3-(methylamino)benzenesulfonic acid | 0 |
| 52 | (125b) | 4-(methylamino)benzenesulfonic acid | 3-(methylamino)benzenesulfonic acid | 1 |
| 53 | (126a) | 3-(methylamino)benzenesulfonic acid | 3-(methylamino)benzenesulfonic acid | 0 |
| 54 | (126b) | 3-(methylamino)benzenesulfonic acid | 3-(methylamino)benzenesulfonic acid | 1 |

TABLE 1-continued
| Example Nr. | Compound Nr. | D₁ | D₂ | n |
|---|---|---|---|---|
| 55 | (127a) | —NHCH₂CH₂OH | 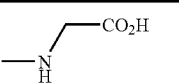 | 0 |
| 56 | (127b) | —NHCH₂CH₂OH | 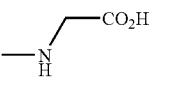 | 1 |
| 57 | (128a) | —N(CH₂CH₂OH)₂ | 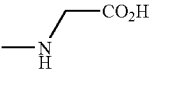 | 0 |
| 58 | (128b) | —N(CH₂CH₂OH)₂ | 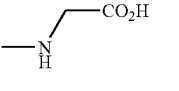 | 1 |
| 59 | (129a) | —NHCH₂CH(CH)₃OH | 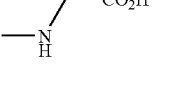 | 0 |
| 60 | (129b) | —NHCH₂CH(CH)₃OH | 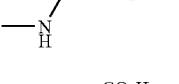 | 1 |
| 61 | (130a) | 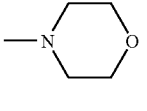 |  | 0 |
| 62 | (130b) | 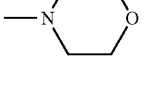 |  | 1 |
| 63 | (131a) | 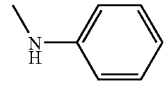 |  | 0 |
| 64 | (131b) | 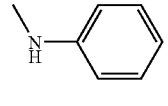 | 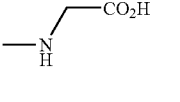 | 1 |
| 65 | (132a) | 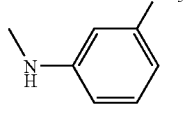 | 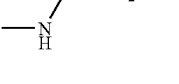 | 0 |
| 66 | (132b) | 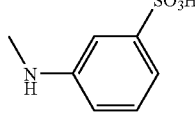 | 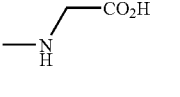 | 1 |
| 67 | (133a) | 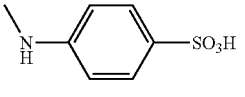 | 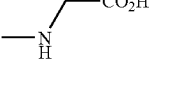 | 0 |
| 68 | (133b) | 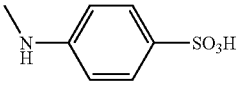 | 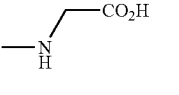 | 1 |
| 69 | (134a) | 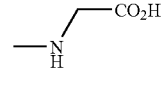 | 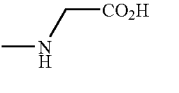 | 0 |

TABLE 1-continued
| Example Nr. | Compound Nr. | D$_1$ | D$_2$ | n |
|---|---|---|---|---|
| 70 | (134b) | 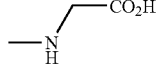 | 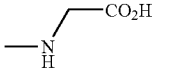 | 1 |
| 71 | (135a) | —NHCH$_2$CH$_2$OH | 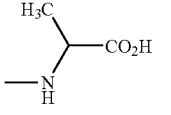 | 0 |
| 72 | (135b) | —NHCH$_2$CH$_2$OH | 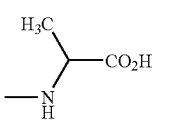 | 1 |
| 73 | (136a) | —N(CH$_2$CH$_2$OH)$_2$ | 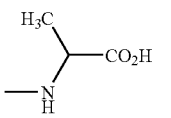 | 0 |
| 74 | (136b) | —N(CH$_2$CH$_2$OH)$_2$ | 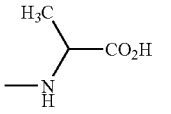 | 1 |
| 75 | (137a) | —NHCH$_2$CH(CH)$_3$OH | 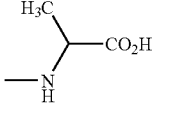 | 0 |
| 76 | (137b) | —NHCH$_2$CH(CH)$_3$OH | 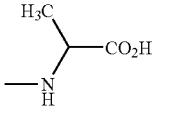 | 1 |
| 77 | (138a) | 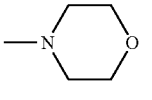 | 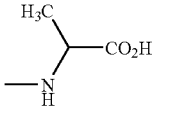 | 0 |
| 78 | (138b) | 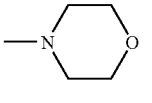 | 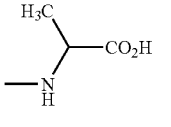 | 1 |
| 79 | (139a) | 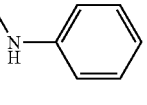 | 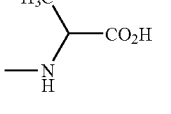 | 0 |
| 80 | (139b) | 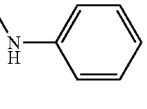 | 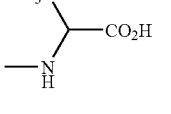 | 1 |
| 81 | (140a) | 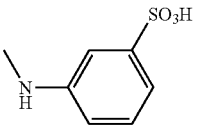 | 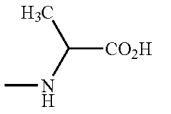 | 0 |

TABLE 1-continued

| Example Nr. | Compound Nr. | D₁ | D₂ | n |
|---|---|---|---|---|
| 82 | (140b) | 3-(methylamino)benzenesulfonic acid (SO₃H on benzene with NH-CH₃) | H₃C-CH(CO₂H)-NH- (alanine) | 1 |
| 83 | (141a) | 3-(methylamino)benzenesulfonic acid | HO₂C-CH(CO₂H)-CH-NH- (aspartic acid) | 0 |
| 84 | (141b) | 4-(methylamino)benzenesulfonic acid | H₃C-CH(CO₂H)-NH- | 1 |
| 85 | (142a) | H₃C-CH(CO₂H)-NH- | H₃C-CH(CO₂H)-NH- | 0 |
| 86 | (142b) | H₃C-CH(CO₂H)-NH- | H₃C-CH(CO₂H)-NH- | 1 |
| 87 | (143a) | —NHCH₂CH₂OH | HO₂C-CH(CO₂H)-CH-NH- | 0 |
| 88 | (143b) | —NHCH₂CH₂OH | HO₂C-CH(CO₂H)-CH-NH- | 1 |
| 89 | (144a) | —N(CH₂CH₂OH)₂ | HO₂C-CH(CO₂H)-CH-NH- | 0 |
| 90 | (144b) | —N(CH₂CH₂OH)₂ | HO₂C-CH(CO₂H)-CH-NH- | 1 |
| 91 | (145a) | —NHCH₂CH(CH)₃OH | HO₂C-CH(CO₂H)-CH-NH- | 0 |
| 92 | (145b) | —NHCH₂CH(CH)₃OH | HO₂C-CH(CO₂H)-CH-NH- | 1 |
| 93 | (146a) | morpholino (—N-morpholine) | HO₂C-CH(CO₂H)-CH-NH- | 0 |

TABLE 1-continued

| Example Nr. | Compound Nr. | D₁ | D₂ | n |
|---|---|---|---|---|
| 94 | (146b) | —N-morpholine (N-linked morpholine) | HO₂C–CH(NH—)–CH₂–CO₂H (aspartic acid) | 0 |
| 95 | (147a) | —NH–C₆H₅ (N-methylanilino) | aspartic acid | 0 |
| 96 | (147b) | —NH–C₆H₅ | aspartic acid | 1 |
| 97 | (148a) | —NH–C₆H₄–SO₃H (3-sulfo) | aspartic acid | 0 |
| 98 | (148b) | —NH–C₆H₄–SO₃H (3-sulfo) | aspartic acid | 1 |
| 99 | (149a) | —NH–C₆H₄–SO₃H (4-sulfo) | aspartic acid | 0 |
| 100 | (149b) | —NH–C₆H₄–SO₃H (4-sulfo) | aspartic acid | 1 |
| 101 | (150a) | aspartic acid | aspartic acid | 0 |
| 102 | (150b) | aspartic acid | aspartic acid | 1 |
| 103 | (151a) | —NHCH₂CH₂OH | glutamic acid | 0 |
| 104 | (151b) | —NHCH₂CH₂OH | glutamic acid | 1 |
| 105 | (152a) | —N(CH₂CH₂OH)₂ | glutamic acid | 0 |

TABLE 1-continued
| Example Nr. | Compound Nr. | D$_1$ | D$_2$ | n |
|---|---|---|---|---|
| 106 | (152b) | —N(CH$_2$CH$_2$OH)$_2$ | 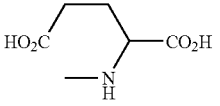 | 1 |
| 107 | (153a) | —NHCH$_2$CH(CH)$_3$OH | 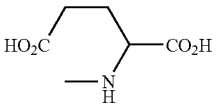 | 0 |
| 108 | (153b) | —NHCH$_2$CH(CH)$_3$OH | 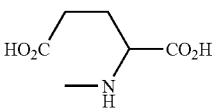 | 1 |
| 109 | (154a) | 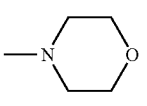 | 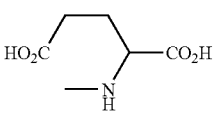 | 0 |
| 110 | (154b) | 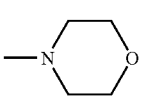 | 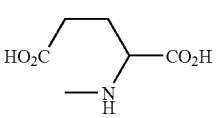 | 1 |
| 111 | (155a) | 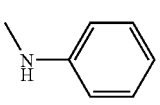 | 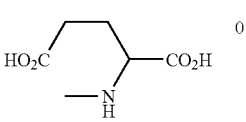 | 0 |
| 112 | (155b) | 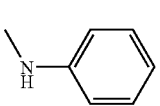 | 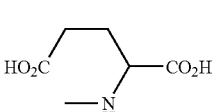 | 1 |
| 113 | (156a) | 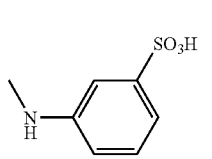 | 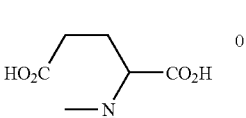 | 0 |
| 114 | (156b) | 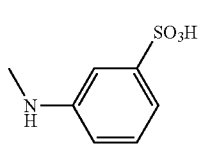 | 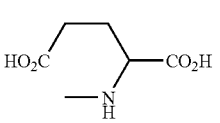 | 1 |
| 115 | (157a) | 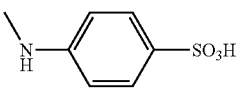 | 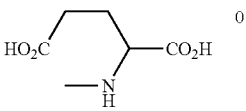 | 0 |
| 116 | (157b) | 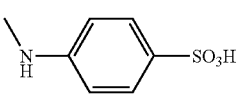 | 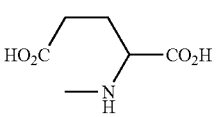 | 1 |
| 117 | (158a) | 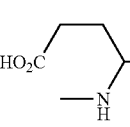 | 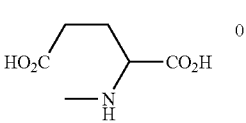 | 0 |

TABLE 1-continued

| Example Nr. | Compound Nr. | D₁ | D₂ | n |
|---|---|---|---|---|
| 118 | (158b) | HO₂C-CH(NH-)-CH₂CH₂-CO₂H | HO₂C-CH(NH-)-CH₂CH₂-CO₂H | 1 |
| 119 | (159a) | —NHCH₂CH₂OH | HO-CH₂-CH(NH-)-CO₂H | 0 |
| 120 | (159b) | —NHCH₂CH₂OH | HO-CH₂-CH(NH-)-CO₂H | 1 |
| 121 | (160a) | —N(CH₂CH₂OH)₂ | HO-CH₂-CH(NH-)-CO₂H | 0 |
| 122 | (160b) | —N(CH₂CH₂OH)₂ | HO-CH₂-CH(NH-)-CO₂H | 1 |
| 123 | (161a) | —NHCH₂CH(CH)₃OH | HO-CH₂-CH(NH-)-CO₂H | 0 |
| 124 | (161b) | —NHCH₂CH(CH)₃OH | HO-CH₂-CH(NH-)-CO₂H | 1 |
| 125 | (162a) | N-morpholinyl | HO-CH₂-CH(NH-)-CO₂H | 0 |
| 126 | (162b) | N-morpholinyl | HO-CH₂-CH(NH-)-CO₂H | 1 |
| 127 | (163a) | —NH-C₆H₅ | HO-CH₂-CH(NH-)-CO₂H | 0 |
| 128 | (163b) | —NH-C₆H₅ | HO-CH₂-CH(NH-)-CO₂H | 1 |
| 129 | (164a) | —NH-C₆H₄-SO₃H | HO-CH₂-CH(NH-)-CO₂H | 0 |

TABLE 1-continued

| Example Nr. | Compound Nr. | D₁ | D₂ | n |
|---|---|---|---|---|
| 130 | (164b) | 3-(methylamino)benzenesulfonic acid (-NH-C₆H₄-SO₃H, meta) | N-methylserine (HO-CH₂-CH(NH-)-CO₂H) | 1 |
| 131 | (165a) | 4-(methylamino)benzenesulfonic acid (-NH-C₆H₄-SO₃H, para) | N-methylserine | 0 |
| 132 | (165b) | 4-(methylamino)benzenesulfonic acid | N-methylserine | 1 |
| 133 | (166a) | N-methylserine | N-methylserine | 0 |
| 134 | (166b) | N-methylserine | N-methylserine | 1 |
| 135 | (167a) | —NHCH₂CH₂OH | N-methylphenylalanine | 0 |
| 136 | (167b) | —NHCH₂CH₂OH | N-methylphenylalanine | 1 |
| 137 | (168a) | —N(CH₂CH₂OH)₂ | N-methylphenylalanine | 0 |
| 138 | (168b) | —N(CH₂CH₂OH)₂ | N-methylphenylalanine | 1 |
| 139 | (169a) | —NHCH₂CH(CH)₃OH | N-methylphenylalanine | 0 |
| 140 | (169b) | —NHCH₂CH(CH)₃OH | N-methylphenylalanine | 1 |
| 141 | (170a) | morpholino | N-methylphenylalanine | 0 |

TABLE 1-continued
| Example Nr. | Compound Nr. | D₁ | D₂ | n |
|---|---|---|---|---|
| 142 | (170b) | 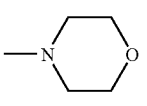 | 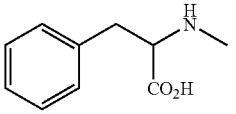 | 1 |
| 143 | (171a) | 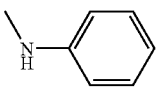 | 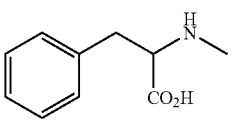 | 0 |
| 144 | (171b) | 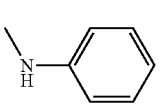 | 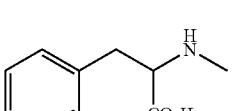 | 1 |
| 145 | (172a) | 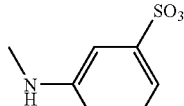 | 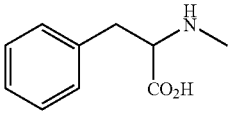 | 0 |
| 146 | (172b) | 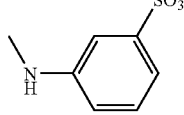 | 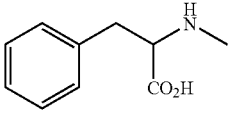 | 1 |
| 147 | (173a) | 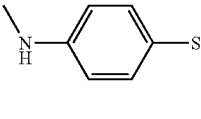 | 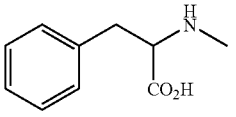 | 0 |
| 148 | (173b) | 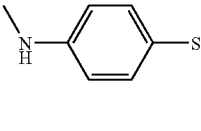 | 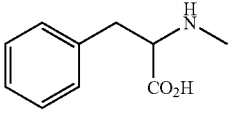 | 1 |
| 149 | (174a) | 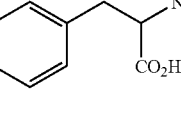 | 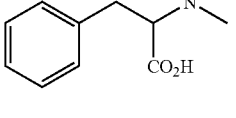 | 0 |
| 150 | (174b) | 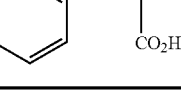 | 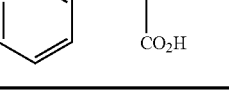 | 1 |

(B) Synthesis of Dyes

Example 151

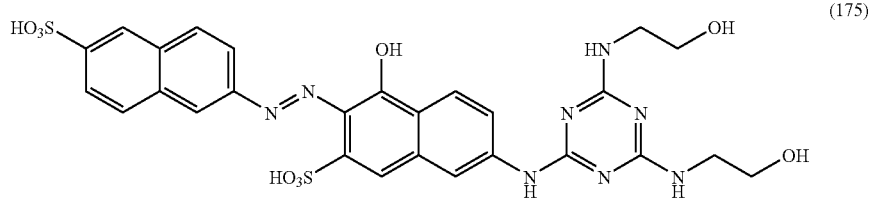

(175)

Example 152

4.5 g of 2-naphthylamine-6-sulphonic acid are suspended in 150 g of water and 5.7 g of concentrated hydrochloric acid and the suspension treated with a total of 5 ml of 4N aqueous sodium nitrite solution over 30 minutes at 0-5° C. The mixture is then stirred for a further 30 minutes and excess nitrite destroyed by addition of 3 ml of 2N aqueous sulphamic acid solution. The resulting orange suspension is then added over 30 minutes at 100° C. to a suspension of 11.3 g of compound (100a) in 100 g of water, the pH of which had previously been adjusted to 5.0 by addition of a small amount of 2N aqueous sodium hydroxide solution. During the addition, the pH is maintained at 5.0-5.5 by addition of a total of 27.9 ml of 4N aqueous sodium hydroxide solution. After stirring for a further 1.5 hours at room temperature, the pH is adjusted to 8-9 to dissolve excess of the coupling component and the solution salted out by addition of 80 g of sodium chloride. After stirring for a further 45 minutes, the resulting red suspension is filtered and the solids washed with a small quantity of water. After drying, there are obtained 8.2 g of the compound of formula (175).

11.2 g of 2-naphthylamine-7-sulphonic acid are suspended in 250 g of water and 14.2 g of concentrated hydrochloric acid and the suspension treated with a total of 12.5 ml of 4N aqueous sodium nitrite solution over 30 minutes at 0-5° C. The mixture is then stirred for a further 30 minutes and excess nitrite destroyed by addition of 1 ml of 2N aqueous sulphamic acid solution. The resulting orange suspension is then added over 1 hour at 10° C. to a suspension of 22.3 g of compound (100a) in 50 g of water, the pH of which had previously been adjusted to 5.5 by addition of a small amount of 2N aqueous sodium hydroxide solution. During the addition, the pH is maintained at 5.0-5.5 by addition of a total of 15.6 ml of 4N aqueous sodium hydroxide solution. After stirring for a further 3 hours at room temperature, the pH is adjusted to 8-9 to dissolve excess of the coupling component and the solution salted out by addition of 150 g of sodium chloride. After stirring for a

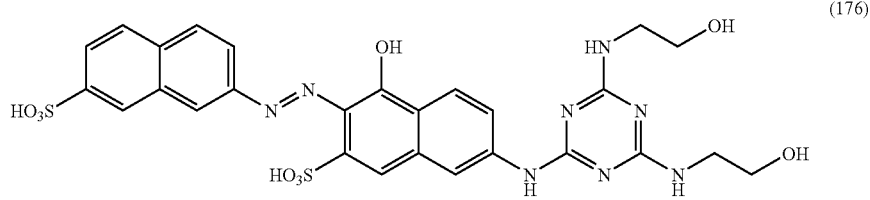

(176)

further 15 minutes, the resulting red suspension is filtered and the solids washed with a small quantity of water. After drying, there are obtained 30 g of the compound of formula (176).

Examples 153-170

By proceeding in a manner analogous to that described in Examples 151 and 152, but replacing the 2-naphthylamine-6- or 7-sulphonic acid by an equivalent quantity of the appropriate amine, the following compounds of formula (4) are obtained, as summarized in Table 2 below.

TABLE 2

(4)

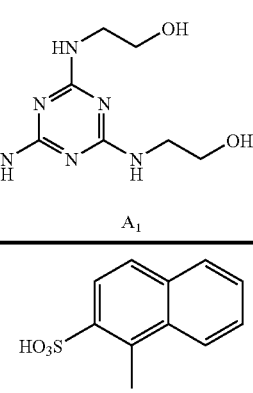

| Example Nr. | Compound Nr. | $A_1$ |
|---|---|---|
| 153 | (177) | 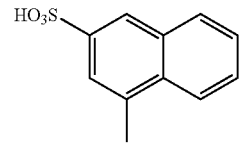 |
| 154 | (178) | 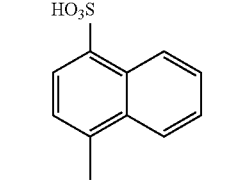 |
| 155 | (179) | 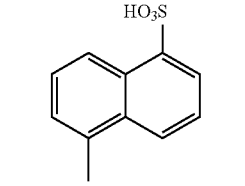 |
| 156 | (180) | 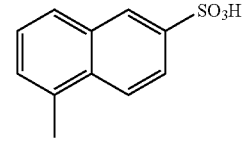 |

TABLE 2-continued (4)

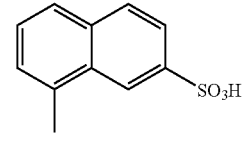

| Example Nr. | Compound Nr. | $A_1$ |
|---|---|---|
| 157 | (181) | 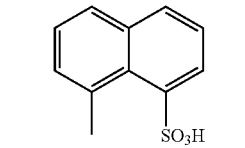 |
| 158 | (182) | 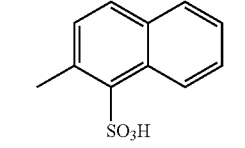 |
| 159 | (183) | 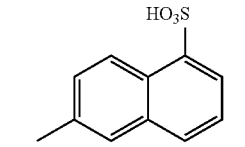 |
| 160 | (184) | 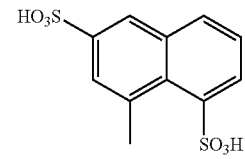 |
| 161 | (185) | 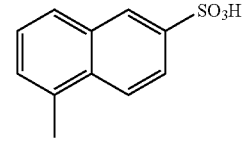 |
| 162 | (186) | 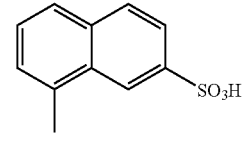 |

TABLE 2-continued
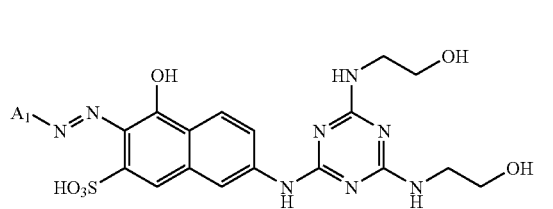
(4)
| Example Nr. | Compound Nr. | A₁ |
|---|---|---|
| 163 | (187) | 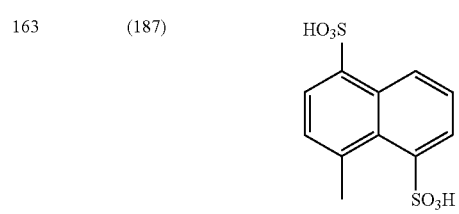 |
| 164 | (188) | 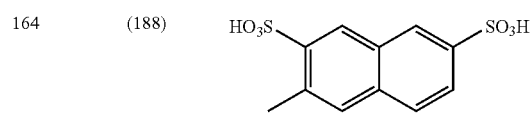 |
| 165 | (189) | 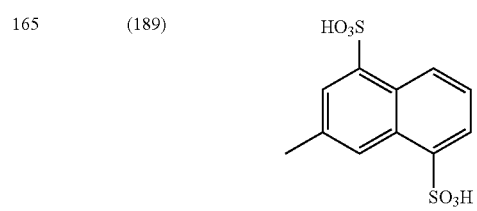 |
| 166 | (190) | 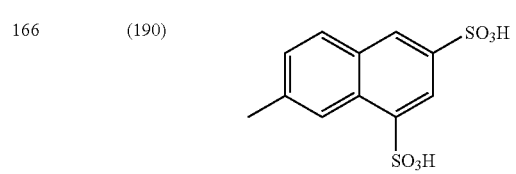 |
TABLE 2-continued
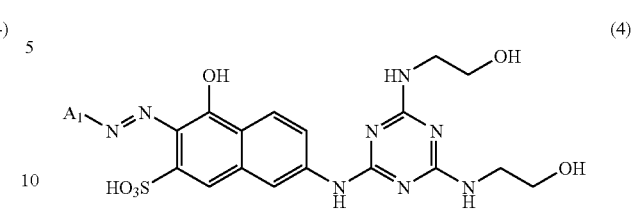
(4)
| Example Nr. | Compound Nr. | A₁ |
|---|---|---|
| 167 | (191) | 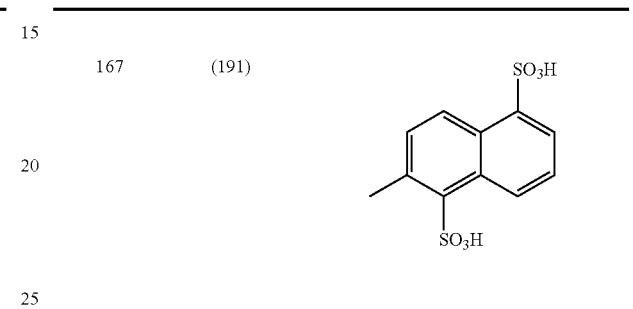 |
| 168 | (192) | 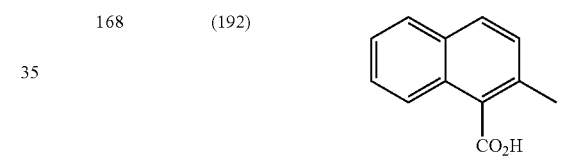 |
| 169 | (193) | 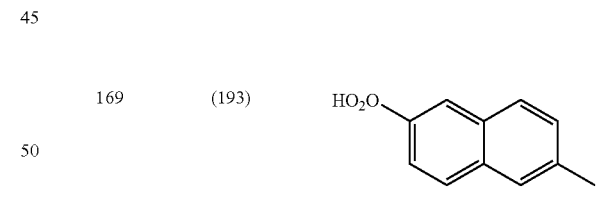 |
| 170 | (194) | 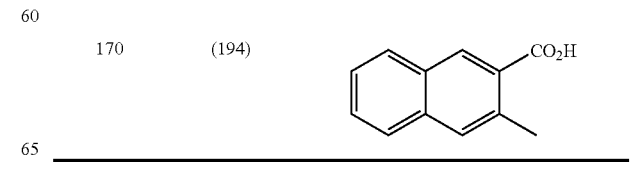 |

Example 171

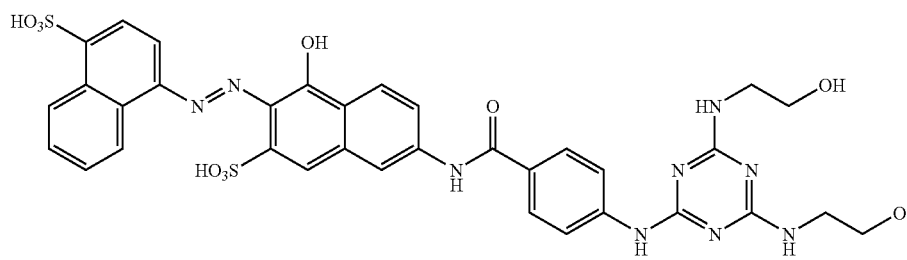

(195)

2.3 g of 1-napthylamine-4-sulphonic acid are suspended in 100 g of water and 2.9 g of concentrated hydrochloric acid and the suspension treated with a total of 2.5 ml of 4N aqueous sodium nitrite solution over 30 minutes at 0-5° C. The mixture is then stirred for a further 30 minutes and excess nitrite destroyed by addition of a small quantity of 2N aqueous sulphamic acid solution. The resulting suspension is then added over 35 minutes at 10° C. to a suspension of 6.7 g of compound (100b) in 100 g of water, the pH of which had previously been adjusted to 6.0 by addition of a small amount of 2N aqueous sodium hydroxide solution. During the addition, the pH is maintained at 6.0-6.5 by addition of a total of 14.9 ml of 2N aqueous sodium hydroxide solution. After stirring for a further 1 hour at room temperature, 80 ml of methanol and 45 g of sodium chloride are added. Stirring is continued for a further 15 minutes, the resulting red suspension is filtered and the solids washed with a small quality of water. After drying, there are obtained 7.5 g of the compound of formula (195).

Example 172

4.95 g of 2-naphthylamine-6-sulphonic acid are suspended in 100 g of water and 5.7 g of concentrated hydrochloric acid and the suspension treated with a total of 5.1 ml of 4N aqueous sodium nitrite solution over 30 minutes at 0-5° C. The mixture is then stirred for a further 30 minutes and excess nitrite destroyed by addition of a small quantity of 2N aqueous sulphamic acid solution. The resulting suspension is then added over 1 hour at 10° C. to a suspension of 13.3 g of compound (100b) in 100 g of water, the pH of which had previously been adjusted to 5.5 by addition of a small amount of 2N aqueous sodium hydroxide solution. During the addition, the pH is maintained at 5.0-5.5 by addition of a total of 13.2 ml of 4N aqueous sodium hydroxide solution. After stirring for a further 4 hours at room temperature, 250 ml of methanol and 35 g of sodium chloride are added. Stirring is continued for a further 30 minutes, the resulting red suspension is filtered and the solids washed with a small quantity of water. After drying, there are obtained 11.0 g of the compound of formula (196).

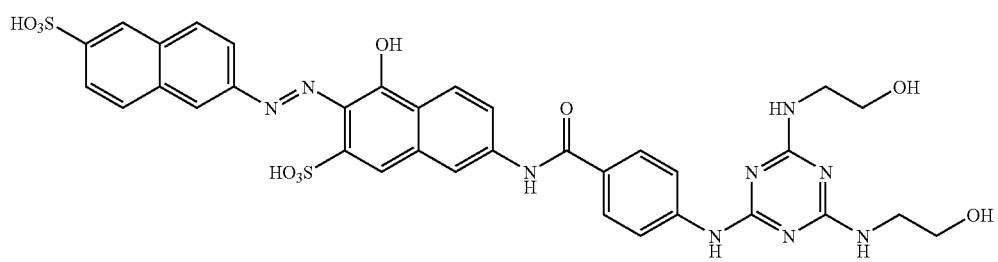

(196)

Example 173

(197)

3.7 g of 2-naphthylamine-1,5-disulphonic acid are suspended in 50 g of water and 2.85 g of concentrated hydrochloric acid and the suspension treated with a total of 2.5 ml of 4N aqueous sodium nitrite solution over 30 minutes at 0-5° C. The mixture is then stirred for a further 1 hour and excess nitrite destroyed by addition of a small quantity of 2N aqueous sulphamic acid solution. The resulting suspension is then added over 40 minutes at 10° C. to a suspension of 6.7 g of compound (100b) in 10 g of water, the pH of which had previously been adjusted to 5.0 by addition of a small amount of 2N aqueous sodium hydroxide solution. During the addition, the pH is maintained at 5.0-6.0 by addition of a total of 18.3 ml of 2N aqueous sodium hydroxide solution. After stirring for a further 1 hour at room temperature, 150 ml of methanol and 50 g of sodium chloride are added. Stirring is continued for a further 30 minutes, the resulting orange suspension is filtered and the solids washed with a small quantity of water. After drying, there are obtained 8.2 g of the compound of formula (197).

Examples 174-190

By proceeding in a manner analogous to that described in Examples 171-173, but replacing the 1-naphthylamine-4-sulphonic acid, 2-naphthylamine-6-sulphonic acid or the 2-naphthylamine-1,5-disulphonic acid by an equivalent quantity of the appropriate amine, the following compounds of formula (5) are obtained, as summarized in Table 3 below.

TABLE 3

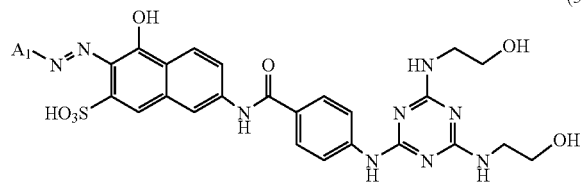

(5)

| Example Nr. | Compound Nr. | $A_1$ |
|---|---|---|
| 174 | (198) | |

TABLE 3-continued

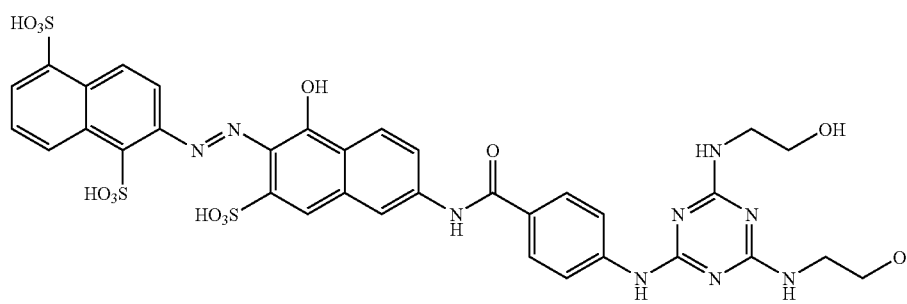

(5)

| Example Nr. | Compound Nr. | $A_1$ |
|---|---|---|
| 175 | (199) | |
| 176 | (200) | |
| 177 | (201) | |
| 178 | (202) | |
| 179 | (203) | |

TABLE 3-continued

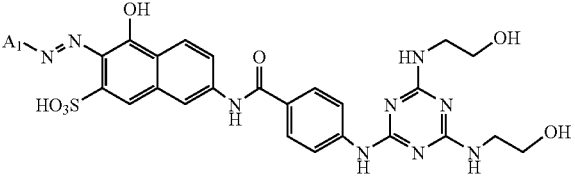

| Example Nr. | Compound Nr. | A₁ |
|---|---|---|
| 180 | (204) | 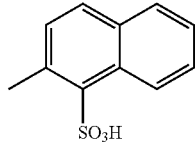 |
| 181 | (205) | 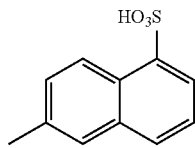 |
| 182 | (206) | 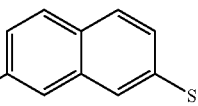 |
| 183 | (207) | 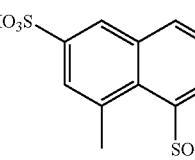 |
| 184 | (208) | 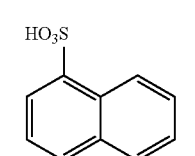 |
| 185 | (209) | 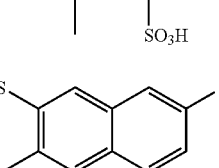 |
| 186 | (210) | 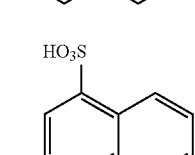 |
| 187 | (211) | 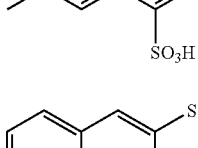 |

TABLE 3-continued

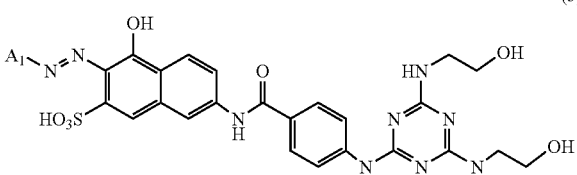

| Example Nr. | Compound Nr. | A₁ |
|---|---|---|
| 188 | (212) | 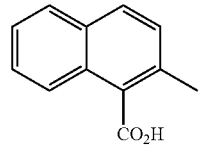 |
| 189 | (213) | 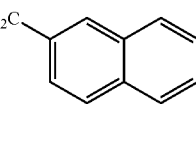 |
| 190 | (214) | 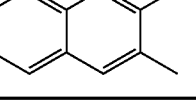 |

Furthermore, by proceeding in a manner analogous to that described for the preparation of the above dyes but utilizing the intermediates (101a)-(174b) described in Table 1 together with the amines described in Examples 151-190, dyes of the corresponding formulae (4) and (5) may also be obtained.

(C) Application Examples

Examples 191-195

A mixture of 50% long fibre spruce sulphite bleached and 50% short fibre beech sulphite bleached fibres is suspended in deionised water, as a 2% suspension, and refined and beaten to 22° SR (Schopper Riegler). After dewatering by means of a centrifuge and testing for dry weight, the equivalent to 10 g of dry fibre are placed in a beaker and made up to the volume of 500 ml with tap water. After stirring for 1 hour, sufficient of the appropriate compound to produce a dyeing of 0.2 standard depth, based on the weight of dry fibre, as a 5 g/l aqueous solution is added to the furnish suspension and stirring continued for a further 15 minutes. The suspension is made up to 700 ml with water and from 300 ml of the resulting suspension a hand sheet is produced using a Lhomargy sheet former. After drying on a cylinder at 90° C. for 12 minutes, the CIELab coordinates and degrees of exhaustion of the dyes in the dyeings obtained are measured. The backwater ratings of the effluents are also assessed on a scale of from 1 (very highly coloured) to 5 (colourless backwater). The results are summarized in Table 4 below.

TABLE 4

| Example Nr. | Compound Nr. | Concentration for 0.2 St. D. | Degree of Exhaustion | Back-water rating | CIELab Coordinates |
|---|---|---|---|---|---|
| 191 | (175) | 0.57% | 87-89% | 3 | H* 21.4<br>C* 49.6<br>L* 62.7<br>*a 46.2<br>*b 18.1 |
| 192 | (176) | 0.74% | 94-96% | 3-4 | H* 27.9<br>C* 55.3<br>L* 65.4<br>*a 48.9<br>*b 25.9 |
| 193 | (195) | 0.82% | 86-88% | 3 | H* 6.8<br>C* 43.5<br>L* 57.7<br>*a 43.2<br>*b 5.2 |
| 194 | (196) | 0.54% | 98-99% | 4-5 | H* 23.5<br>C* 52.0<br>L* 64.3<br>*a 47.7<br>*b 20.8 |
| 195 | (197) | 1.1% | 79-81 | 2 | H* 37.4<br>C* 56.5<br>L* 69.2<br>*a 44.8<br>*b 34.3 |

The invention claimed is:

1. A compound of the formula (1)

in which
- A represents a 1- or 2-naphthyl residue, which is substituted by a total of one or two sulphonic and/or carboxylic acid groups,
- $R_1$ represents hydrogen each
- $D_1$ and $D_2$, independently of the other, represent either an amino acid residue resulting from removal of a hydrogen atom from the amino group of the amino acid or the residue
- $-NR_2R_3$, in which each
- $R_2$ and $R_3$, independently of the other, represent hydrogen, $C_1$-$C_4$alkyl, $C_2$-$C_6$alkyl which is substituted by hydroxy, halogen or cyano, phenyl which is unsubstituted or monosubstituted by hydroxy, halogen, $SO_3H$, $C_1$-$C_4$alkyl or $C_1$-$C_4$alkoxy or, alternatively,
- $R_2$ and $R_3$, together with the nitrogen atom to which they are connected, complete a saturated, 5- or 6-membered ring which may contain, in addition to the nitrogen atom, one nitrogen or oxygen atom and which may be further substituted and
- n is 0 or 1.

2. A compound of formula (1), according to claim 1, in which
A represents a 1- or 2-naphthyl mono- or disulphonic acid or a 1- or 2-naphthyl monocarboxylic acid residue.

3. A compound of formula (1), according to claim 1, in which
$D_1$ and $D_2$, independently of the other, is an amino acid residue resulting from removal of a hydrogen atom from the amino group of the amino acid and which is derived from glycine, alanine, serine, cysteine, phenylalanine, tyrosine (4-hydroxyphenylalanine), diiodotyrosine, tryptophan (β-indolylalanine), histidine (β-imidazolylalanine), α-aminobutyric acid, methionine, valine (α-aminoisovaleric acid), norvaline, leucine (α-aminoisocaproic acid), isoleucine (α-amino-β-methylvaleric acid), norleucine (α-amino-n-caproic acid), arginine, ornithine (α,β-diaminovaleric acid), lysine (α,β-diaminocaproic acid), aspartic acid (aminosuccinic acid), glutamic acid (α-aminoglutaric acid), threonine and hydroxyglutamic acid as well as mixtures and optical isomers thereof or from iminodiacetic acid, a residue
$-NR_2R_3$, in which each
$R_2$ and $R_3$, independently of the other, represent hydrogen, $C_2$-$C_4$hydroxyalkyl, phenyl, which is unsubstituted or monosubstituted by $SO_3H$ or, alternatively, a morpholino, piperidino or pyrrolidino residue.

4. A compound of formula (1), according to claim 1, in which
A represents a 1-naphthyl-2-, 3-, 4-, 5-, 6-, 7- or 8-sulphonic acid, a 2-naphthyl-1-, 5-, 6- or 7-sulphonic acid, a 2-naphthyl-1-, 3- or 6-carboxylic acid, a 1-naphthyl-3,8- or 4,8-disulphonic acid or a 2-naphthyl-1,5-, 3,6-, 4,8- or 6,8-disulphonic acid residue and each
$D_1$ and $D_2$, independently of the other, is an amino acid residue from which a hydrogen atom on the amino group has been removed and which is derived from glycine, alanine, serine, phenylalanine, aspartic acid (aminosuccinic acid) or glutamic acid (α-aminoglutaric acid), a residue
$-NR_2R_3$, in which each
$R_2$ and $R_3$, independently of the other, represent hydrogen, $C_2$-$C_3$hydroxyalkyl, phenyl, which is unsubstituted, or monosubstituted by $SO_3H$ or, alternatively, a morpholino residue.

5. A process for the preparation of the compound of formula (1), according to claim 1, comprising reacting the diazonium salt of an amine of the formula $A-NH_2$ (2)

with either 2-amino- or 2-$C_1$-$C_4$alkylamino-5-hydroxynaphthalene-7-sulphonic acid (where n=0) or with 2-(4-amino- or 4-$C_1$-$C_4$alkylaminobenzoyl)amino- or $C_1$-$C_4$alkylamino-5-hydroxynaphthalene-7-sulphonic acid (where n=1), reaction with cyanuric chloride and subsequent sequential reaction of the dichloro intermediate with amines $D_1H$ and $D_2H$ or, alternatively, reacting 2-amino- or 2-$C_1$-$C_4$alkylamino-5-hydroxynaphthalene-7-sulphonic acid (where n=0) or 2-(4-amino- or 4-$C_1$-$C_4$alkylaminobenzoyl)amino- or $C_1$-$C_4$alkylamino-5-hydroxynaphthalene-7-sulphonic acid (where n=1) with cyanuric chloride, followed by sequential reaction of the dichloro intermediate with amines $D_1H$ and $D_2H$ and, finally, reaction with the diazonium salt of the amine of formula (2), whereby A, $D_1$, $D_2$ and n are as defined in claim 1.

6. A solid dye composition for dyeing paper, comprising a compound of the formula (1), according to claim 1, and, optionally, further auxiliaries.

7. An aqueous solution for dyeing paper, comprising a compound of the formula (1), according to claim 1, and, optionally, further auxiliaries.

8. An aqueous solution according to claim 7 containing, as further auxiliaries, solubilizers and/or organic solvents.

9. A paper which is dyed with a compound of the formula (1), according to claim 1, wherein the compound of formula (1) is in the form of a solid dye composition or an aqueous solution, comprising a compound of the formula (1), according to claim 1, and optionally, further auxiliaries.

10. A method for dyeing pulp comprising adding the compound of formula (1), according to claim 1, to a pulper.

11. A method for dyeing paper comprising applying the compound of formula (1), according to claim 1, to paper.

12. A method according to claim 11, wherein the formula (1) of claim 1 is sprayed on the paper.

* * * * *